3,143,700
RESISTANCE NETWORKS FOR STABILIZING PHASE SHIFT IN RESOLVERS AND THE LIKE
William Jabez George Cox, Bletchingley, England, assignor to Computing Devices of Canada Limited, Ottawa, Ontario, Canada, a company of Canada
Filed Aug. 12, 1960, Ser. No. 49,274
6 Claims. (Cl. 323—69)

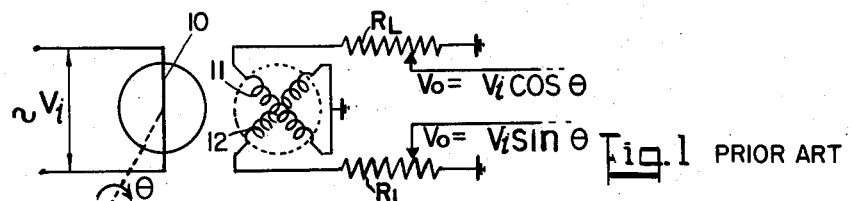
Fig. 1 PRIOR ART
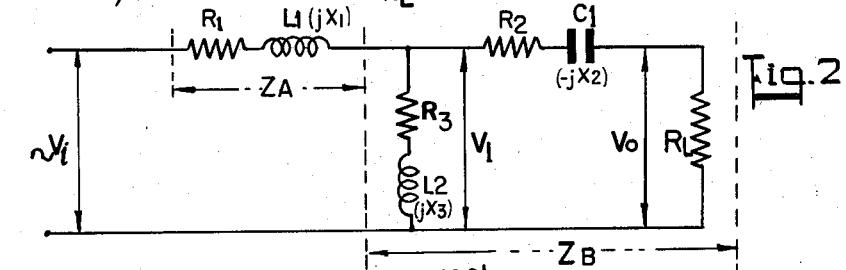
Fig. 2
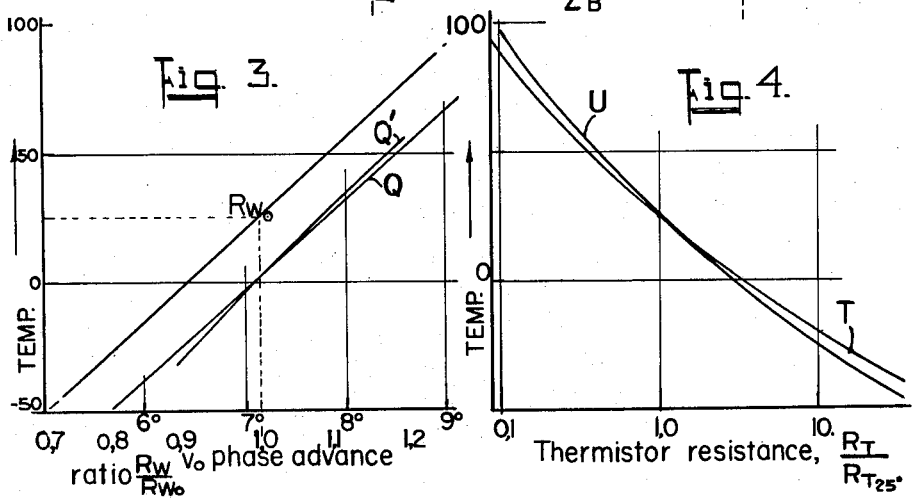
Fig. 3.
Fig. 4.
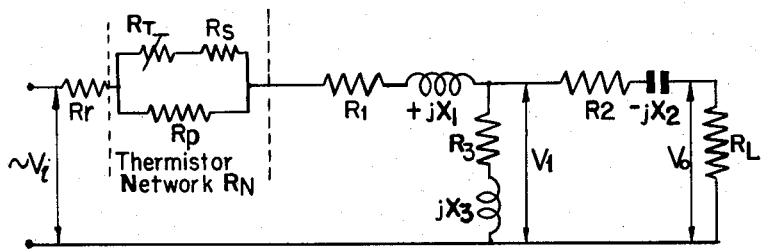
Fig. 5.
INVENTOR
WILLIAM JABEZ GEORGE COX
by R. J. Filipkowski
PATENT AGENT INVENTOR
WILLIAM JABEZ GEORGE COX
by R. J. Filipkowski
PATENT AGENT

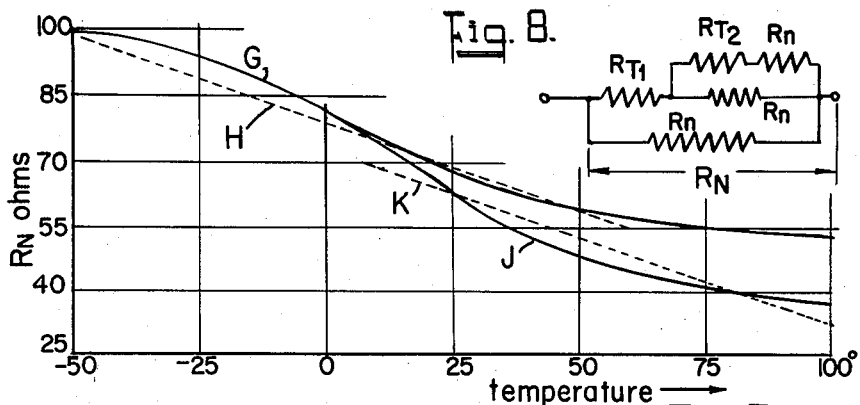
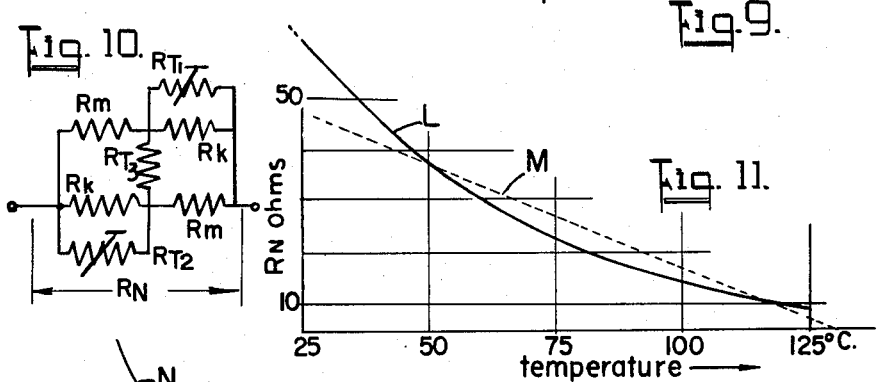
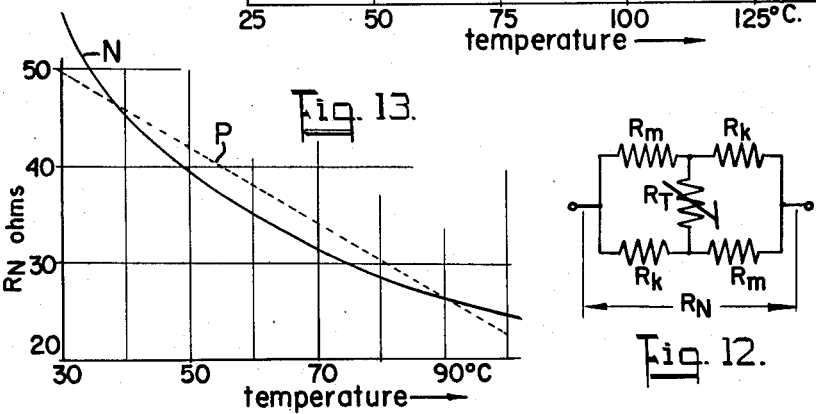
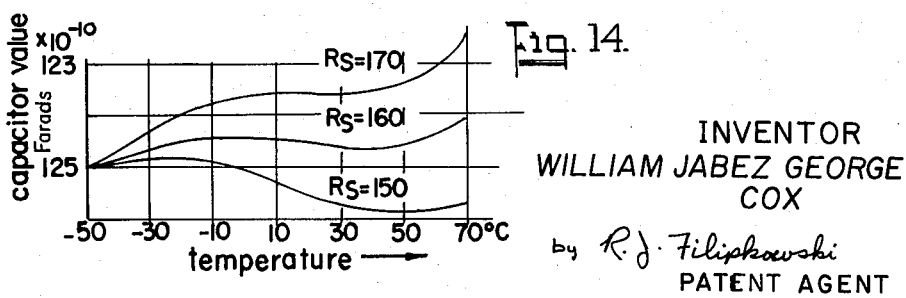
INVENTOR
WILLIAM JABEZ GEORGE COX
by R. J. Filipkowski
PATENT AGENT United States Patent Office 3,143,700
Patented Aug. 4, 1964

This invention relates to computers and particularly concerns resistance networks for stabilizing phase shift in resolvers used in computers of the electromechanical type wherein vector quantities may be resolved into two mutually perpendicular component vectors, or wherein component vectors may be combined into a resultant vector quantity.

Analogue computers employing alternating voltage inputs for the computation of quantities such as bearing and range, utilizing a resolver and servo system for transformation of co-ordinate systems from the Cartesian to polar form or vice versa, are subject to operating errors due to environmental change, particularly fluctuation of temperature of component elements. Computers of this type employing high gain amplifiers in the servo drive loops to position an output element feeding back an anti-phase balancing voltage to the amplifier input, suffer degradation of computational accuracy when the feedback voltage is not in precise phase opposition to the inputs. This invention is concerned to provide a method of overcoming phasing errors over wide ranges of temperature of computer elements.

It is a principal object of this invention to provide a resistive impedance network composed of temperature stable resistances and non-linearly temperature variable resistors, wherein the latter are realized as thermistors, for regulating the excitation current fed into an induction regulator such as a synchro resolver, between whose inputs and outputs a temperature dependent variation of phase angle and magnitude is inherent, so as to stabilize the outputs over wide useful temperature ranges.

It is also an object of the invention to provide a stabilization system for an analogue computer employing a servo-controlled feedback loop to the input of an amplifier driving the servo device, so that the feedback voltage is in anti-phase relation with the input voltages.

It is a further object of the invention to provide a simple stabilization system for maintaining substantially constant the amplitude and phase of current fed from an alternating current source to a reactive load, comprising an induction regulator element such as a synchro resolver, between whose input and output terminals there exists an inherent phase difference, and to provide a corrective series-connected impedance network for establishing a desired phase relationship between input and output voltages.

In order that the invention may be more clearly understood and readily carried into effect it will now be more fully described with reference to the accompanying drawings, in which, FIG. 1 illustrates diagrammatically a known form of synchro resolver having output voltages whose magnitudes are respectively proportional to the sine and cosine functions of an angle assumed by the rotor with respect to the stator;

FIG. 2 is a known T network analogue of the circuit of FIG. 1, between the input and one of two similar outputs;

FIG. 3 graphically presents the relative variation of phase angle of outputs of a resolver such as is shown in FIG. 1, with respect to input voltage, and variation of winding resistance, with changes in temperature;

FIG. 4 is a plot showing the temperature-versus-resistance characteristics of two known classes of thermistor materials;

FIG. 5 diagrammatically illustrates the schematic of FIG. 2 having connected therein, according to the invention, a corrective stabilizing network including a temperature-dependent element;

FIG. 6 illustrates in schematic form one analogue computer scheme for conversion of data from the Cartesian co-ordinate system to polar co-ordinate form, embodying stabilizing and phase-correcting networks according to the invention;

FIG. 7 diagrams the resistance characteristics of the stabilizing network of FIG. 5 over a range of temperature;

FIG. 8 shows another form of network employing two thermistors and stable resistors;

FIG. 9 is a plot of the resistance variations with temperature of the network of FIG. 8;

FIG. 10 is an alternative network employing three thermistors;

Figure 6:
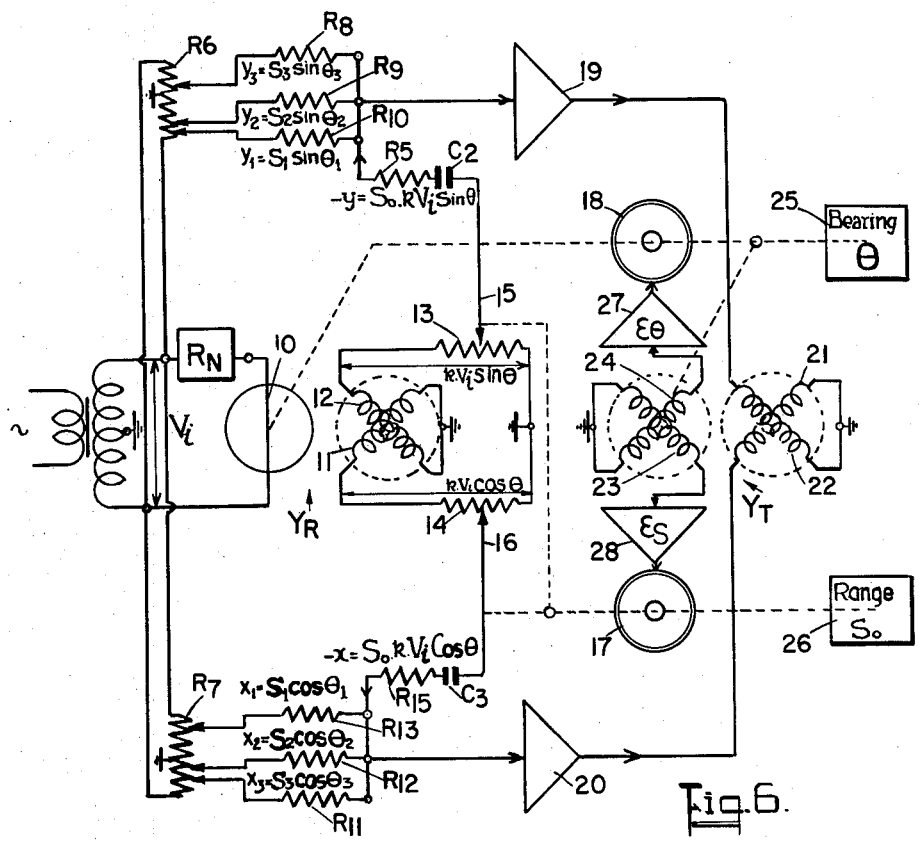

FIG. 11 describes graphically the variation of resistance with temperature of the network of FIG. 10;

FIG. 12 shows another form of single thermistor network;

FIG. 13 graphically presents the resistance characteristics of the network of FIG. 12; and, FIG. 14 relates to a family of curves showing a method of determining the value of a compensating capacitance in the resolver outputs of FIG. 6.

Referring to FIGURES 1 and 3, in a typical synchro resolver arrangement illustrated, a rotor winding 10 is energized from a source of alternating voltage $V_i$, and stator windings 11 and 12 produce output voltages having magnitudes proportional to the input voltage according to the sine and cosine functions of the rotor angle $\theta$. As will be apparent from FIG. 3, the phase of each output voltage is advanced from that of the supply $V_i$, and the angle of lead varies, increasing as the apparatus temperature increases which objectionable characteristic has long been recognized.

Referring additionally to FIG. 2, the resolver network may be simulated for purpose of analysis by a conventional T network terminated by a resistive load $R_L$, wherein the two series branches respectively exhibit inductive and capacitive impedance, and the shunt arm has inductive impedance. The greater part of the input impedance $Z_A$ is the resistance $R_1$, mainly contributed by the windings of the device, which have a linear temperature coefficient of resistance in the usual case where the windings are of copper wire:

$$R_W = R_{W_0}(1+0.004\Delta T)$$

where:

$R_W$ is the winding resistance at any temperature, and
$R_{W_0}$ is the resistance at the reference temperature, usually 25° C., from which $\Delta T$ is measured.

Those skilled in the art will readily recognize in the circuit of this figure, that arrangement of elements of pure resistances and inductive and capacitive reactances, by which an induction regulator such as a synchro may be simulated for purpose of analysis. Such simulated circuits may be studied further by reference to texts and other published matter such as the publication of the Kearfott Division of General Precision Inc. of Little Falls, New Jersey, wherein on page 53 of the bulletin entitled "Technical Information for the Engineer" (No. 1), published February 15, 1958, there are shown various T-network analogues for resolvers. As used throughout this specification and in the claims, I intend the term "T-network analogue" to convey the meaning and intent ascribed to such simulating T networks as may be substituted in a circuit for a physical resolver with substantially the same loading effects on a supply.

From a determination of the magnitude of the network parameters $R_1$, $R_2$, $R_3$, $L_1$, $L_2$, and $C_1$, and assuming $R_L$ to be large in comparison with the aforesaid resistances, the relative phase angle of the output $V_o$ with respect to the input $V_i$ may be computed, as the curve $Q'$ for a range of temperatures. By actual measurement, for a large population of commercially mass produced synchro resolvers, a substantially linear phase shift with temperature as indicated by the line $Q$ has been observed. It will therefore be apparent that the variation in winding resistance $R_W$, having its counterpart in the real component $R_1$ of the network parameters, is largely responsible for the phase variation effects with change of temperature, where $R_1$ is significantly larger than $R_2$ or $R_3$.

Referring to FIG. 5, the interposition of an additional resistive network into FIGURE 2 having a net resistance value $R_N$ in series with the resolver input, leads to a determination of the ratio of output voltage $V_o$ to the input $V_i$ as the relation:

$$\frac{V_o}{V_i} = \frac{Z_B \cdot R_L}{(Z_A + Z_B + R_N)(R_L + R_2 - jX_2)}$$

The foregoing transfer function may be derived by those interested, according to the analytic methods published in texts on the subject of networks, as in "Automatic Feedback Control," by Ahrendt and Taplin, pp. 36–39, published by McGraw-Hill Book Company Inc., of New York.

In a typical resolver, the several impedance terms of the transfer function may be assigned the following values at the operating frequency, usually 400 cycles:

$R_N = 80$ ohms (variable)
$R_1 = 100$ ohms (variable)
$X_1 = 300$ ohms (variable)
$R_2 = 20$ ohms (variable)
$X_2 = 120$ ohms (variable)
$R_3 = 20$ ohms (variable)
$X_3 = 250$ ohms (variable)
$R_L = 2000$ ohms (variable)

The ratios:

$$\frac{jX_3}{R_L} \text{ and } \frac{R_3}{jX_3}$$

being small, and both $R_2$ and $X_2$ being small compared with $R_L$, the term "$Z_B$" may be approximately represented by $jX_3$ alone, so that the transfer function simplifies to:

$$\frac{V_o}{V_i} = \frac{jX_3}{(R_N + R_1) + (jX_1 + jX_3)}$$

The expression may be re-written in the more revealing form:

$$\frac{V_o}{V_i} = \frac{X_3}{(R_N + R_1)_2 + X^2}[X + j(R_N + R_1)]$$

where:

$$X = X_1 + X_3$$

In the above form the transfer function has no imaginary terms in its denominator, and clearly shows the expression tends to constancy of magnitude and phase when $R_N$ and $R_1$ have a constant sum at any temperature over a desired range.

The effect of increase of the resistance terms is to increase the phase advance between output and input. Small changes in $(R_N + R_1)$ affect the phasing much more than the amplitude, due to the appearance of the resistance sum as a squared term in the denominator and as a first power term in the numerator quadrature component.

A trimming resistor $R_T$ is interposed ahead of the network $R_N$ in series with the resolver, wherever it may be desirable to establish a predetermined magnitude for $V_o/V_i$, and to adjust the phase of the output of the compensated system.

In the network of FIG. 5, the single thermistor $R_T$ together with series resistor $R_s$ is shunted by $R_p$. The resistance-versus-temperature characteristic of a thermistor has the form according to the law:

$$\frac{R_T}{R_{25}} = \epsilon^{b\left(\frac{1}{T} - \frac{1}{298}\right)}$$

or, $$\log_n \frac{R_T}{R_{25}} = b\left(\frac{1}{T} - \frac{1}{298}\right)$$

where:

$R_T$ is the resistance at T° abs.;
$R_{25}$ is the resistance at room temperature, 25° C.;
$b$ is a constant.

FIG. 4 shows this characteristic graphically for two of the many characteristic types of thermistor material available for differing values of "$b$." It is a property of material of these types that their "$b$" factors cause their resistance to be halved over the temperature range from about 10° to 20° C. This steep characteristic requires modification with an additional network formed of resistors which are themselves insensitive to temperature changes, to form a useful correction circuit having temperature coefficient of resistance matching that of conductors such as copper.

In the idealized resolver circuit of FIG. 5 the objective of network $R_N$ is to maintain the sum of $R_N$ and the real part $R_1$ of the resistance of the resolver input of constant value over the temperature range of apparatus use.

If:

$R_N$ is the network resistance at any temperature,
$R_{N25}$ is the network resistance at 25° C.,
$R_W$ is taken to be the resolver input resistance approximately equal to $R_1$,
$R_{W0}$ is the winding resistance at 25° C.,
$\Delta T$ is the temperature range considered, and,
"$K$" is the thermistor network temperature coefficient of resistance (negative), then:

$$R_N \approx R_{N25}(1 + k.\Delta T)$$

and $$R_W \approx R_{W0}(1 + 0.004\Delta T)$$

The sum of $R_N$ and $R_W$ may be expressed as:

$$R_{eff} \approx R_{N25} + R_{W0} + \Delta T(0.004 R_{W0} + k.R_{N25})$$

In order that $R_{eff}$ may be independent of temperature the quantity within the brackets must approximate to zero, hence:

$$k = \frac{-0.004 R_{W0}}{R_{N25}}$$

From the foregoing, it may be assumed that in a given resolver the thermistor network design factors "$k$" and $R_{N25}$ are relatable as above, so that determination of one factor automatically establishes the magnitude of the other. This relationship is subject to the condition that $R_N$ may not be zero at any temperature.

For purposes of illustration, assuming that the winding resistance (essentially $R_1$) has a value of about 100 ohms in a typical resolver, the thermistor network must therefore be chosen to have the characteristic:

$$k.R_{N25} = -0.4$$

with the restriction that:

$$0 > k.\Delta T > -1$$

Assuming further that a temperature range $\Delta T$ of 100° C., including the 25° C. point, is required, "$k$" must theoretically lie within the range:

$$-0.01 < k < 0$$

and practical networks must avoid the extreme boundaries and conform approximately to:

$$-0.007 < k < -0.003$$

with a corresponding range for $R_{N25}$:

$$57 < R_{N25} < 133$$

Figure 7:
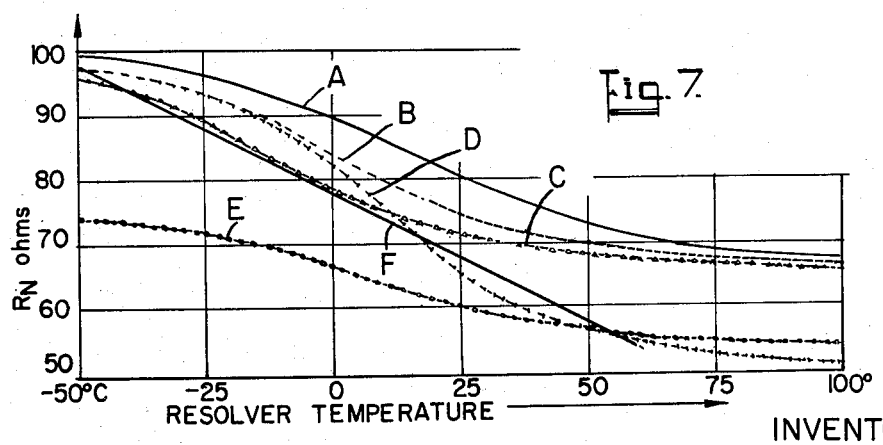

For the network of FIG. 5, employing different values of $R_s$ and $R_p$, and choosing a thermistor having "$k$" and $R_{N25}$ characteristics selected in accordance with the foregoing, a family of generally inflected curves of negative slope may be derived over an extended range of resolver operating temperatures. Resistance curves A, B, C, D, and E shown in FIG. 7 represent possible variations of an infinite variety, all generally characterized in that they have low negative slopes at the low and high ends of the temperature range, and an intermediate zone where the slope rises to a greater negative value. The values of the network components are tabulated in the following Table I for each curve.

Table I

| Curve | Network Parameters, ohms | | |
|---|---|---|---|
| | $R_s$ | $R_p$ | $R_{T25°}$ |
| A | 200 | 100 | 200 |
| B | 200 | 100 | 100 |
| C | 200 | 100 | 50 |
| D | 100 | 100 | 100 |
| E | 200 | 75 | 100 |

In each instance the thermistor material has the characteristics graphically depicted by curve "T" of FIGURE 4, and $R_s$ and $R_p$ are not affected in value by changes of temperature over the range.

For the resolver assumed in this discussion the linear relationship, i.e., the slope "$k$" of the plot of the temperature-versus-resistance characteristic, must be derived by a corrective network to compensate the winding resistance changes. The solid straight line "F" drawn through three points of curve D, having the desired slope, shows that reasonable approximation by this network is achieved over a temperature range from about −50° to +60° C. Similar matching to a desired "K" slope may be achieved over portions of other curves.

It will be apparent therefore that it is generally possible to manipulate the parameters of a thermistor network employing a single thermistor, as hereinbefore described, to compensate for a given variation in resolver input resistance due to temperature, it being understood that the network must physically be located adjacent to or in contact with the resolver to be subject to the same temperature conditions.

FIG. 8 shows a network of two thermistors, $R_{T1}$ and $R_{T2}$ each nominally of 100 ohms resistance at 25° C., wherein the stable resistors $R_n$ also have 100 ohms resistance over the range. In FIG. 9, lower curve J represents the network resistance variation with temperature, while upper curve G relates to the network of FIG. 5, curve E in FIG. 7, for purpose of comparison. It will be evident that the two-thermistor arrangement achieves a slope which reasonably corresponds to a straight line "$k$" value, for which $R_{N25}$ is 62 ohms, and $k$ is −0.0064. Straight line H has a similar slope, and an $R_{N25}$ value of 68 ohms, and would apply to a lower range of temperatures than the network of characteristic curve K.

In the arrangement of FIG. 10 the three temperature-variable non-linear resistors $R_{T1}$, $R_{T2}$, and $R_{T3}$ are each chosen for an $R_{T25}$ value of 100 ohms, $R_m$ 200 ohms, and $R_k$ 10 ohms, both $R_m$ and $R_k$ being stable with temperature. The span of temperature for which the network has practical compensating effect extends from about 40 to about 130° C., as shown by curve L and idealized network characteristic M of FIG. 11.

The single thermistor network of FIG. 12, similar to FIG. 10 except that only the shunt arm of the ladder circuit carries a thermistor, has the same parameters as in FIG. 10, and its curve N of resistance variation approximates over the range 35° C. to 100° C. to the line P of an idealized network having an $R_{N25}$ value of 52 ohms, and a "$k$" value of −0.0077.

From the foregoing exemplary embodiments it will be seen that over the limited ambient temperature variations for which particular resolvers may be required to work, it is possible to achieve reasonable compensation of the variation in phase of output voltage caused by temperature changes, by suitably designing an input stabilizer network using one or more thermistors and series-parallel stable resistances.

The advantages of the compensatory network may be more readily grasped by considering the larger computational system diagrammatically shown in FIG. 6, employing a resolver $Y_R$ having the network $R_N$ according to the invention associated therewith. The system illustrated performs the conversion of summated Cartesian component $x$ and $y$ quantities, designated $x_1$, $y_1$, $x_2$, $y_2$, and $x_3$, $y_3$, represented by alternating voltage analogues, to a single resultant vector having bearing $\theta$ and range $S_0$. The electromechanical computer employs an electrical resolver $Y_T$ having stator windings 21 and 22 in space quadrature, and rotor windings 23 and 24 also in space quadrature, wherein the rotor is driven by servo motor 18 to the position $\theta$, representing bearing or azimuth of the computed vector quantity.

The input voltages, respectively representing the "$y$" or north-south components and the "$x$" or east-west components of a series of input vectors $S_1$, $S_2$, $S_3$, having respective bearings $\theta_1$, $\theta_2$, $\theta_3$, are derived from respective potentiometer devices $R_6$ and $R_7$, or which may be supplied by various separate potentiometers or transducers energized from the same main transformer, fed with supply voltage $V_i$. In practice, this voltage will be stabilized as to frequency and waveform and to constant R.M.S. value. Considering the component summation of the "$y$" components, the analogue voltages for $y_1$, $y_2$ and $y_3$ are respectively fed in series with their summing resistors $R_{10}$, $R_9$, and $R_8$ to the input of a high gain amplifier 19. Since the potentiometer devices introduce no reactive impedances, the several inputs are co-phasal with the supply $V_i$.

Resolver rotor winding 10 is also fed from supply $V_i$ and by virtue of the fact that the angular position of the rotor is $\theta$, stator windings 11 and 12 respectively deliver outputs proportional to:

$$V_i \cdot \cos \theta, \text{ and } V_i \cdot \sin \theta$$

which are substantially in phase with each other, but displaced in phase with respect to $V_i$, by an angle lying in the range of about 2 to 9 degrees in the absence of the correction network $R_N$, and subject to phase variation with temperature.

By the resolving action of two-phase to two-phase resolver $Y_T$, there are applied as respective inputs to the amplifiers 27 and 28, quantities representing the discrepancy $\epsilon\theta$ between the assumed rotor position and the computed bearing angle $\theta$, and the discrepancy $\epsilon s$ between the null voltage output of amplifiers 19, 20 and the actual output to stator windings 21, 22. When the latter windings are receiving current, the rotor of $Y_T$ is driven by the action of servo motor 18 to seek the position $\theta$, and range determining servo motor 17 is driven to seek a position of the feedback tapping points 15 and 16 on the resolver output potentiometers 13 and 14, so that a null input is delivered to the windings.

By the interposition of $R_N$, the phase of each output voltage on the potentiometers 13 and 14 will be advanced further for a given operating temperature, as may be directly verified by reference to FIG. 2 and FIG. 5 and computation of the circuit impedance and phase relations. The capacitors C2 and C3 are accordingly chosen of such value that in conjunction with the impedance summing network resistors $R_5$ and $R_{15}$, the feedback voltage at the input to the amplifier is brought precisely into antiphase relation with respect to the inputs. Accordingly, the feedback quantities, respectively:

$$-y = S_0.K'.V_i.\text{sine } \theta$$

and $$-x = S_0.K'.V_i.\text{cosine } \theta$$

where $K'$ is a constant of proportionality, each satisfy the requirement that a sharp null or balance may be obtained when the correct settings of range ($S_0$) and of bearing ($\theta$) are made by the servo mechanisms. The outputs of amplifiers 19, 20 may therefore be brought to zero for stable input conditions, and hunting is avoided as when the null is obscured by dephasage.

The determination of the value of a phase-shifting capacitor C2 or C3 may be made most accurately by an empirical calibration procedure, as will be next described. Assuming that the network $R_N$ has been properly designed for a given temperature range in the circuit of FIG. 6, the anti-phase condition for each feedback lead may be precisely adjusted for each temperature by adding to or subtracting from a nominal value computed for C2 and C3, as in FIG. 14. By jointly varying the value of $R_s$ and capacity where the network is made up as in FIG. 5, a very precise compensation may be made. By suitably proportioning the network parameters and selection of optimum capacitor values, it is possible to limit phase change into the amplifier input within a band less than $\pm 7$ minutes over a temperature change of $-50°$ C. to $70°$ C., using a single thermistor, while additional improvement is realizable by networks having more than one thermistor.

I claim:

1. A compensating circuit for an inductive transfer device having input and output windings and a transfer function between a supply source of fixed frequency and voltage connected to the input and a high resistance load connected to the output such that the electrical analogue is representable by a first series portion having a real component of resistive impedance substantially equal to a function of said winding resistances and a series inductive reactance component, and a second series portion comprising substantially only an inductive reactance component, said compensating circuit being connected between said supply and an input winding and comprising a combination of shunt and series resistances including a thermistor disposed for temperature equality with said windings and having a circuit resistance exhibiting a negative temperature coefficient of resistance such that the sum of said resistive impedance and said compensating circuit resistance is approximately constant over a predetermined temperature range.

2. A compensating circuit as in claim 1 wherein a thermistor and a stable resistor are connected as a first branch in series with said device, and a second stable resistor is connected in shunt with said first branch.

3. A compensating circuit as in claim 1 wherein a thermistor is connected in series with a stable resistor and a second thermistor and a second stable resistor are connected in shunt with said first stable resistor, and a third stable resistor is connected in shunt with said first thermistor and stable resistor, said stable resistors being of equal resistance.

4. A compensating circuit as in claim 1 wherein a resistance bridge is formed of two pairs of stable resistors arranged with like resistors in opposite arms and resistors of a pair being unequal, and a thermistor connected across the arm junctions.

5. A compensating circuit as in claim 4 further including a thermistor connected in shunt across each of two opposite arms of said bridge.

6. A compensating circuit for stabilizing the relative magnitude and the phase of an output voltage transferred from the input to the output of an induction regulator having a loaded output winding and having an input winding fed from an alternating voltage supply and having a transfer function therebetween representable by a T network analogue, said analogue comprising a resistive load, a low impedance connection between a terminal of said load and one side of said supply, a first and a second circuit portion connected in series between another terminal of said load and the other side of said supply, said first circuit portion comprising a self-regulating resistance in series with an inductive reactance, said second circuit portion comprising a resistance in series with a capacitive reactance, a shut circuit connected between the junction of said first and second circuit portions and said supply comprising a resistance and an inductive reactance having a combined impedance small in comparison with said load, said self-regulating resistance comprising the combination of the temperature-variable real resistance part of the impedances of said windings and having a positive temperature coefficient of resistance characteristic, with a temperature-variable resistance connected externally of the regulator but in heat transfer relation with the input winding and having a negative temperature coefficient of resistance characteristic chosen so that said combination exhibits a resultant resistance which remains substantially constant over a predetermined range of temperature of said regulator.

References Cited in the file of this patent

UNITED STATES PATENTS

| | | |
|---|---|---|
| 2,050,703 | Johnson | Aug. 11, 1936 |
| 2,278,633 | Bagnall | Apr. 7, 1942 |
| 2,332,643 | Johnson | Oct. 26, 1943 |
| 2,442,097 | Seeley | May 25, 1948 |
| 2,740,935 | Statsinger | Apr. 3, 1956 |
| 2,764,731 | Koerner | Sept. 25, 1956 |